Jan. 17, 1928.  
S. B. BERKOWICH  
1,656,768  
TESTING DEVICE FOR ELECTRIC WIRING SYSTEMS  
Filed Jan. 8, 1927  
2 Sheets-Sheet 1

Inventor  
S. B. Berkowich  
By Eugene C. Brown  
Attorney

Jan. 17, 1928. 1,656,768
S. B. BERKOWICH
TESTING DEVICE FOR ELECTRIC WIRING SYSTEMS
Filed Jan. 8, 1927  2 Sheets-Sheet 2
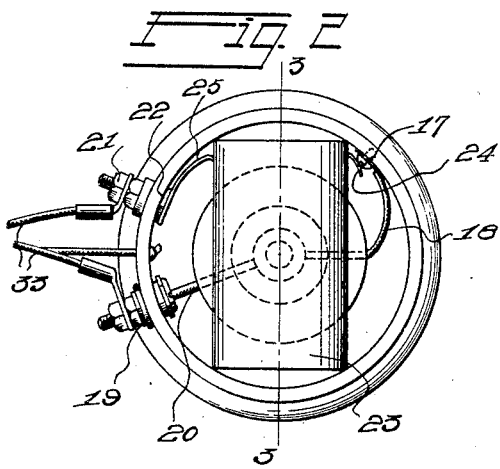
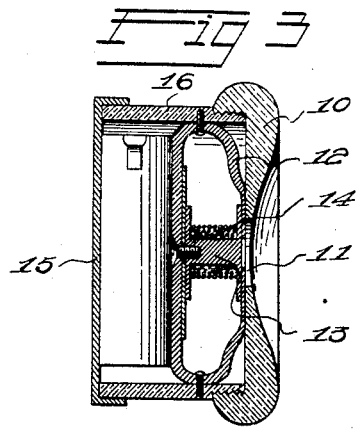
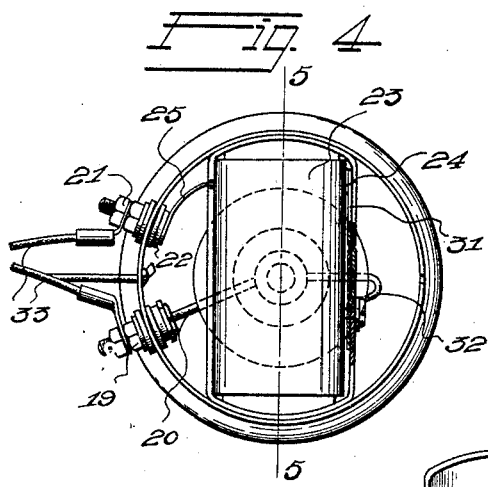
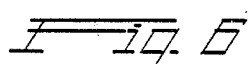
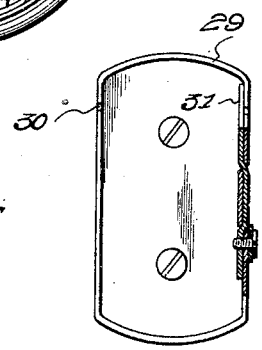
Inventor
S. B. Berkowich
By
Eugene C. Brown
Attorney Patented Jan. 17, 1928.

1,656,768

UNITED STATES PATENT OFFICE.

SOLOMON B. BERKOWICH, OF BALTIMORE, MARYLAND.

TESTING DEVICE FOR ELECTRIC WIRING SYSTEMS.

Application filed January 8, 1927. Serial No. 159,966.

This invention relates to a circuit tester for electrical wiring and apparatus.

The principal objects of the invention are to provide an improved and novel ear piece and battery arrangement for such a tester wherein the ear piece or telephone receiver will contain in itself the necessary battery for operating the device, and in which the battery used will be of the small dry cell type common in pocket flash lights and will be readily removable for replacement by a new battery when exhausted.

With the above and other objects in view there will now be described and claimed certain embodiments of the invention, reference being had to the accompanying drawings, wherein:

Figure 2 is rear view of an ear piece constructed in accordance with this invention, the rear cover plate being removed.

Figure 3 is a section on the line 3—3 of Figure 2.

Figure 4 is a view similar to Figure 2 but showing a second form of the invention.

Figure 5 is a section on the line 5—5 of Figure 4.

Figure 6 is a view of the battery pocket of the second form removed from the casing.

Figure 1:
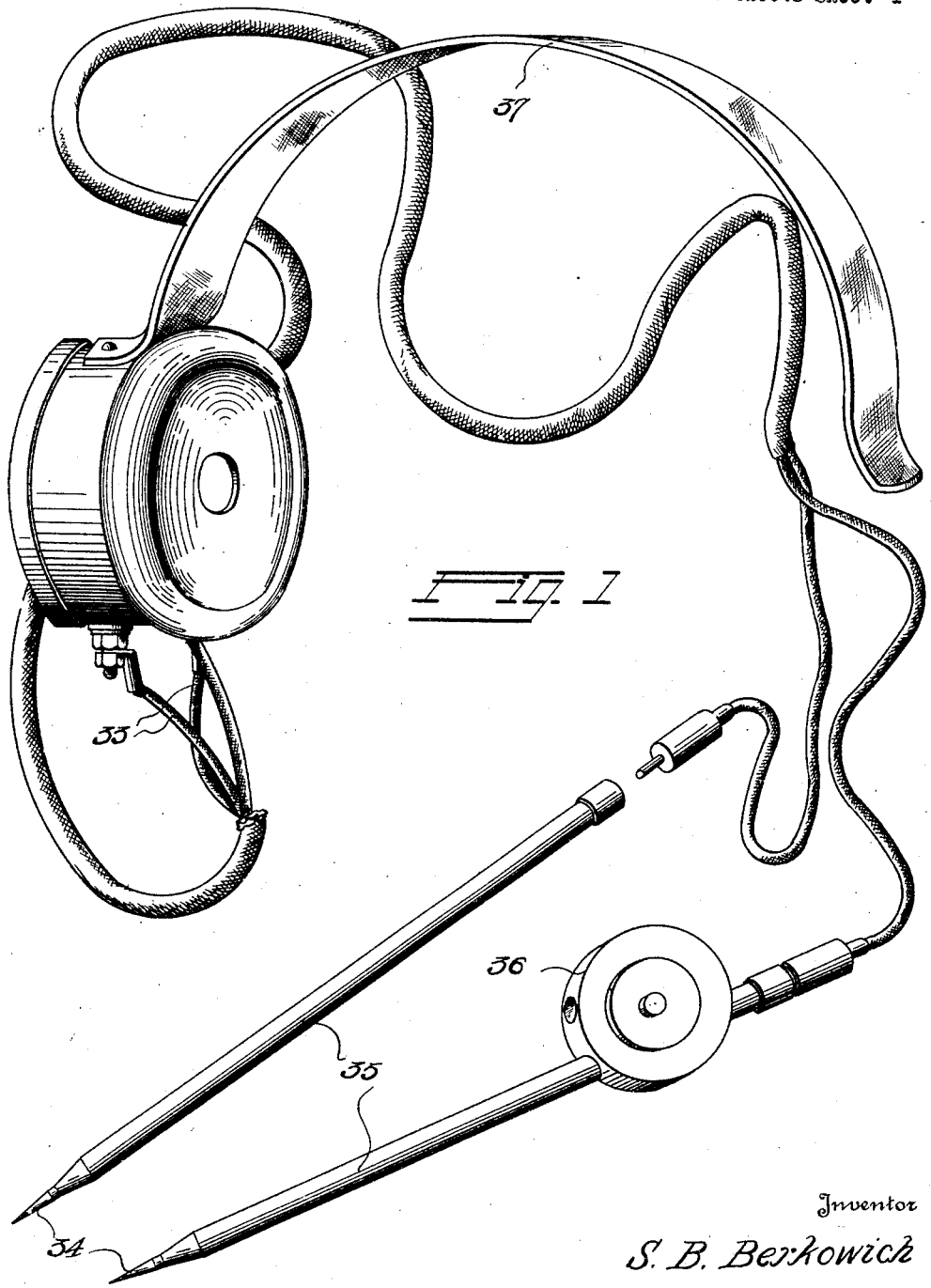
Figure 1 is a perspective view of a testing apparatus equipped with the present invention.

In each of the forms herein shown there is provided a telephone receiver having the usual cylindrical casing closed at one end by a cap 10 of concave form and having a central aperture 11. Supported in the casing is a suitable telephonic receiver 12 provided with the usual magnet 13 and its energizing coil 14. Also the back of each casing is provided with a removable closure 15.

In the form shown in Figures 2 and 3 the casing itself is constructed of insulating material as shown at 16 and secured to one wall of the casing is a terminal 17 forming a contact terminal, the terminal being connected by a wire 18 with the winding 14 of the magnet. Also supported on the wall of the casing is a binding post 19 which is connected by a wire 20 with the winding 14. A second binding post 21 is provided on its inner end with a contact 22. In this form of the device a small dry battery cell 23 is employed which has the usual short terminal 24 and long terminal 25, the short terminal contacting with the contact 17 and the long terminal contacting with the contact 22 upon the battery being placed in position in the casing 16.

In the form shown in Figures 4, 5 and 6 the casing 26 is formed of metallic material and instead of the magnetic receiver 12 being supported on the casing it is supported on a partition plate 27 extending across the casing. Secured to this partition plate by the same screws 28 which hold the plate and receiver together is a cell 29 of insulating material, this cell being of suitable width and depth to receive the battery 23 and having a notch 30 in one edge for the long terminal 25 to pass through. A contact strip 31 extends into this cell, as best seen in Figure 6, for engagement by the battery terminal 24 and this strip is connected by a wire 32 with the magnetic winding 14. The binding post construction is the same as in the first form.

Connected to the binding posts are the lead wires 33 which carry the testing terminals 34 suitably inclosed in insulating tubes 35. A holder 36 may be employed for these terminals and the ear piece may have a head band 37 attached thereto for convenience to the operator.

The operation of testing is that commonly employed, the terminals 34 being brought into contact with spaced points in the circuit to be tested and the continuity of the circuit being indicated by a click in the receiver due to the completion of a circuit through the battery and winding 14.

It will be seen that with this arrangement the ear piece and battery form a compact unit and that the battery may be removed from time to time as desired in the usual simple manner of inserting such batteries in their casings.

Having thus described the invention, what is claimed as new, is:

1. In a detector for testing circuits, a casing, a telephone receiver carried by the casing, said casing having a battery space therein, a contact in said battery space having electrical connection with the receiver and positioned for engagement by one terminal of the battery, a binding post carried by the casing to receive the connection of one of a pair of testing terminals and having electrical connection with the receiver, a second contact in the battery space adapted for engagement by the remaining terminal of the battery, and a second binding post for the remaining testing terminal connection and having electrical connection with the second contact.

2. In a detector for testing circuits, a casing having a headpiece secured thereto, a telephone receiver within said casing, said casing having a battery space behind said receiver, a contact in said battery space electrically connected to the receiver and positioned for engagement by one terminal of the battery, a second contact in the battery space positioned for engagement by the remaining terminal of the battery, and a pair of testing terminals connected respectively to the receiver and to said second contact.

In testimony whereof I affix my signature.

SOLOMON B. BERKOWICH.